May 25, 1965  H. C. MOORE ETAL  3,184,772
TELESCOPING LOADING AND UNLOADING STRUCTURE FOR AIRCRAFT
Filed Feb. 2, 1959  5 Sheets-Sheet 1

INVENTORS
HERBERT CARVEL MOORE
CARL L. LODJIC
BY THEIR ATTORNEYS
HARRIS, KIECH, RUSSELL & KERN

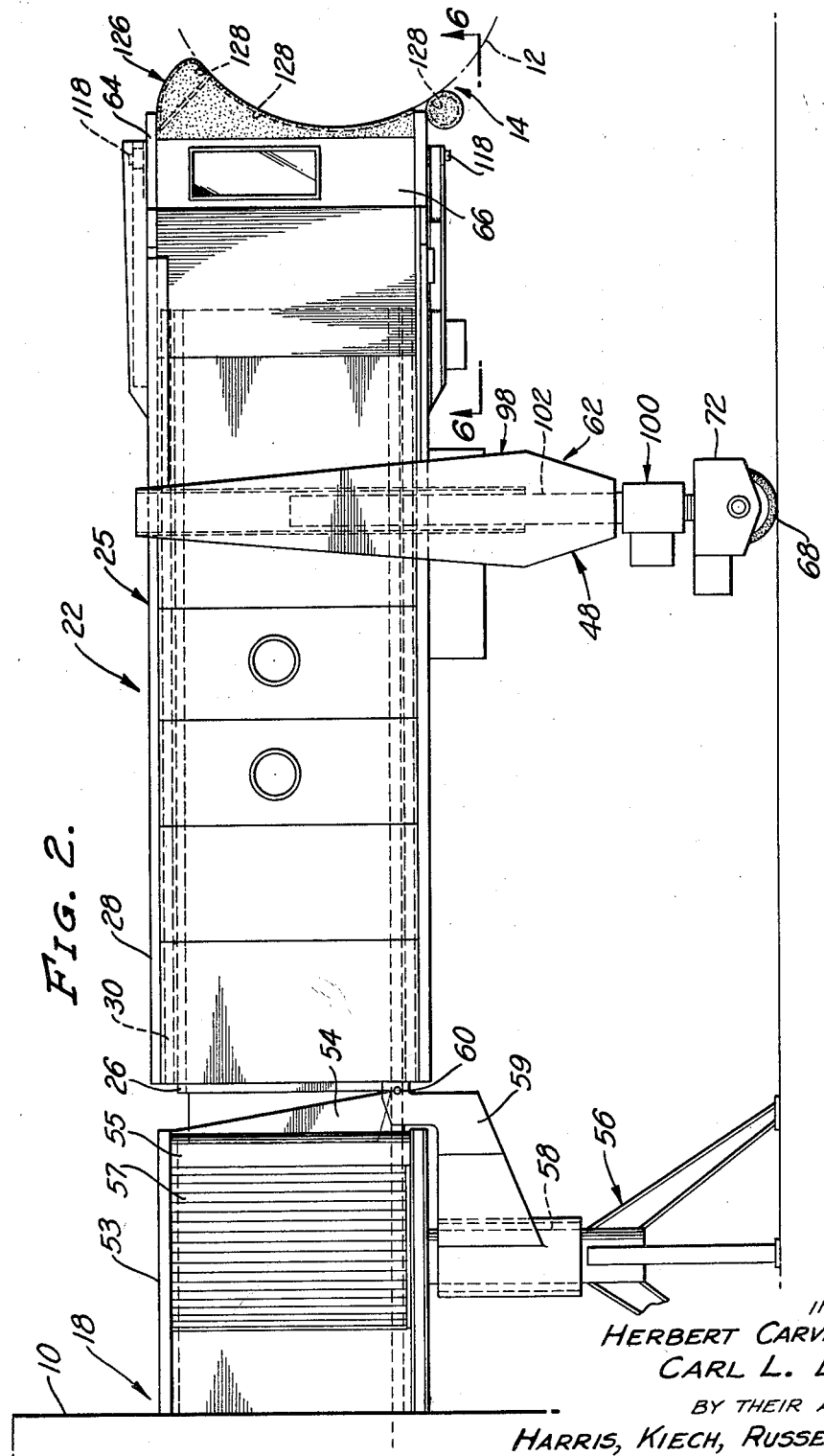

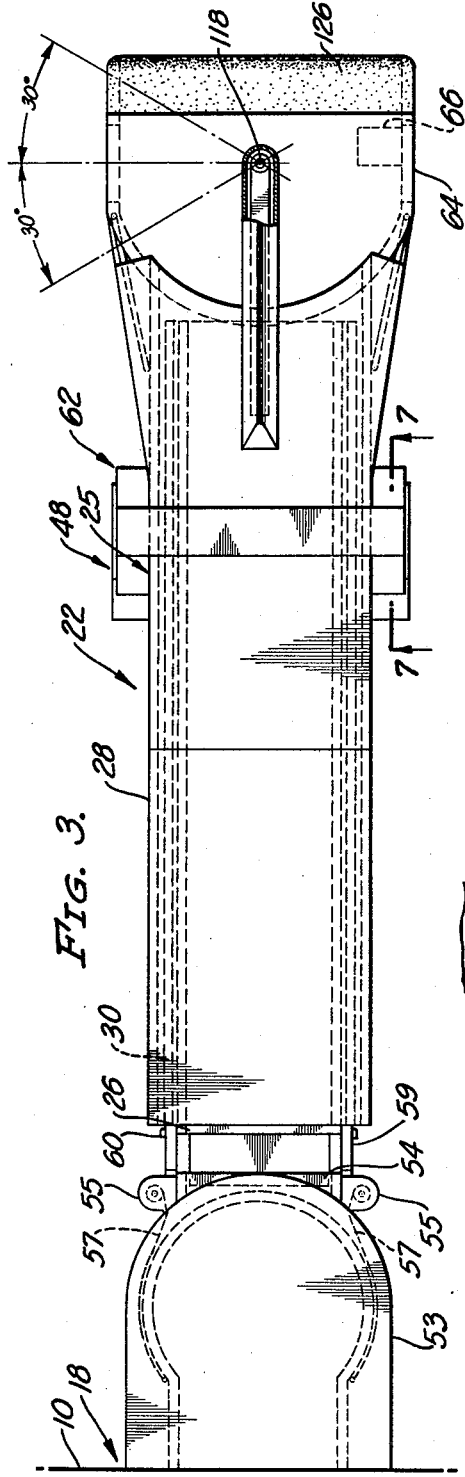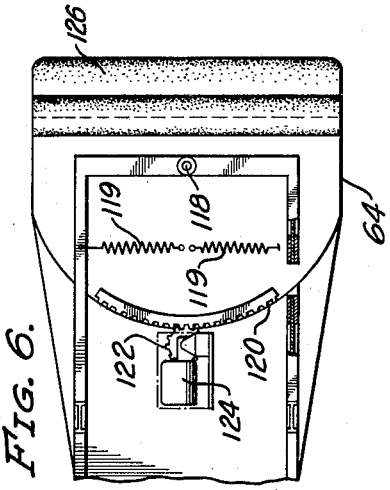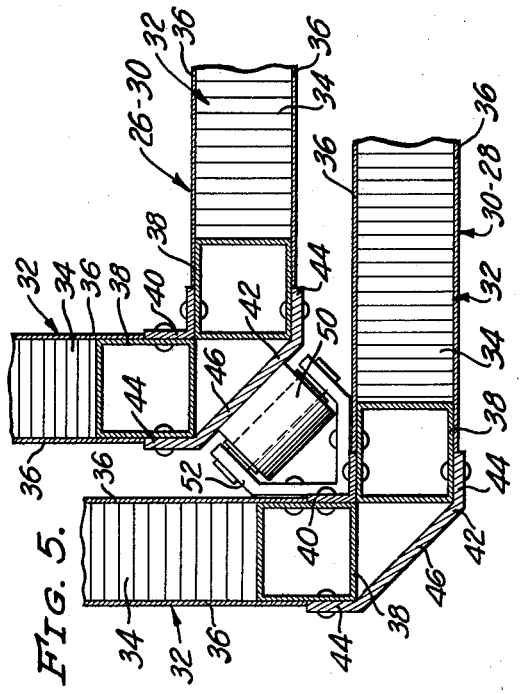

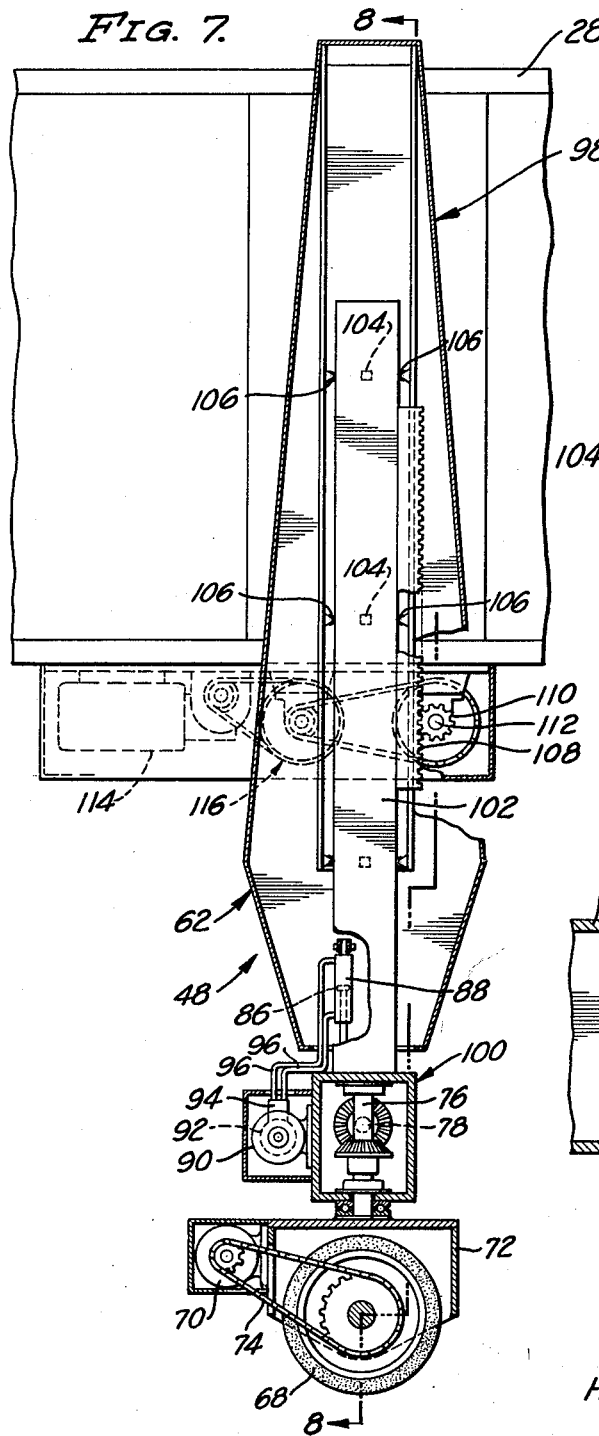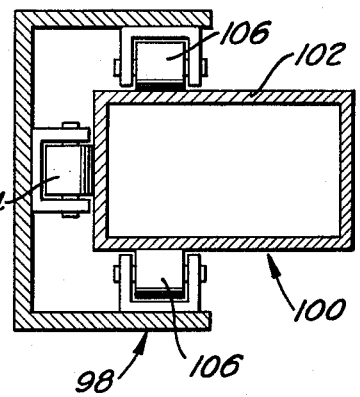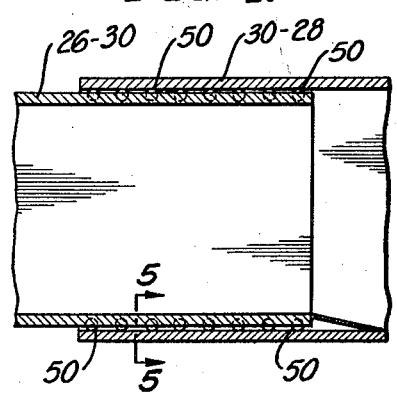

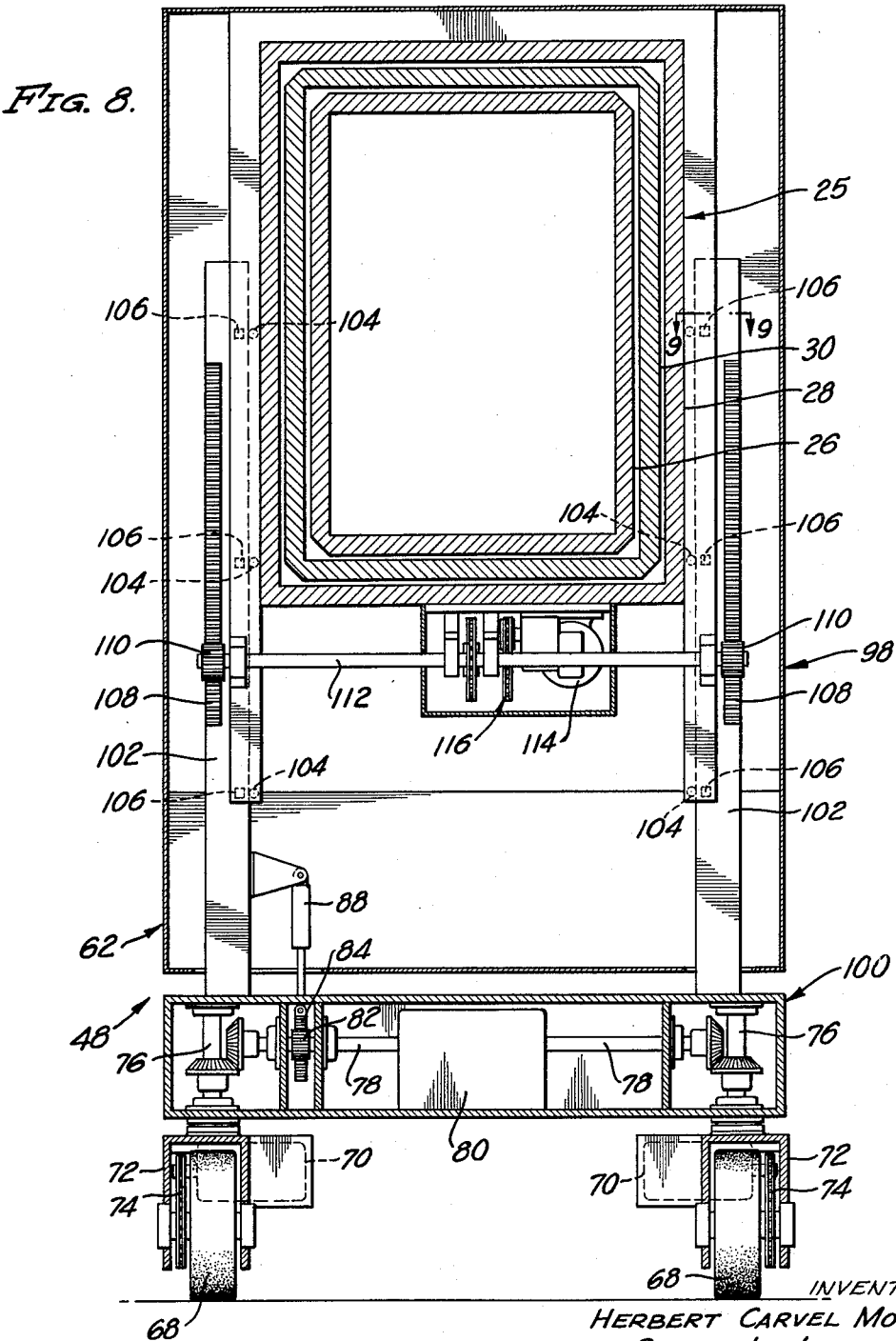

United States Patent Office 3,184,772
Patented May 25, 1965

3,184,772
TELESCOPING LOADING AND UNLOADING STRUCTURE FOR AIRCRAFT
Herbert Carvel Moore, West Los Angeles, and Carl L. Lodjic, Long Beach, Calif., assignors, by mesne assignments, to Stanray Corporation, Chicago, Ill., a corporation of Delaware
Filed Feb. 2, 1959, Ser. No. 790,584
3 Claims. (Cl. 14—71)

The present invention relates in general to a telescoping vehicular loading and unloading structure and, more particularly, to a telescoping structure which is intended primarily for use with aircraft, or other vehicles, to load and unload passengers, although it may be utilized for other purposes.

The invention contemplates a passenger loading and unloading structure of the type which includes a telescoping passageway adapted to bridge the space between a doorway of an airport terminal building, or other point of embarkation and debarkation, and a doorway of an aircraft parked adjacent the building, the doorway in the building preferably being above ground level, e.g., at the second floor level so that the passageway is generally horizontal. The telescoping passageway registers with the doorway in the building at its inner end and is adapted to be extended to reach the doorway in the aircraft at its outer end, the inner end of the passageway being anchored with respect to the building for pivotal movement about horizontal and vertical axes to permit swinging the outer end of the passageway vertically and horizontally, as the passageway is extended and contracted, to move it into precise register with the doorway in the aircraft. Such vertical and horizontal swinging movement of the outer end of the passageway is effected by a self-propelled, wheeled supporting structure connected to the passageway outwardly of the inner end thereof and having means for raising and lowering the outer end thereof. With a structure of this type, the outer end of the passageway may be brought into register with the doorway in the aircraft by simultaneously maneuvering the supporting structure to swing the passageway horizontally, actuating the means for swinging the passageway vertically to raise and lower the outer end thereof, and actuating means for extending and contracting the passageway.

In telescoping loading and unloading structures of the foregoing type which have been proposed heretofore, the self-propelled, wheeled supporting structure has been connected to the passageway adjacent the outer end of an inner section thereof. Consequently, maneuvering of the supporting structure can effect only horizontal swinging of the passageway, it being necessary to provide separate means for extending and contracting the passageway, in addition to separate means for swinging the passageway vertically to raise and lower the outer end thereof. A primary object of the present invention is to overcome this disadvantage of prior structures of the type under consideration by so constructing the self-propelled, wheeled structure, and by so connecting it to the passageway, that it performs the function of extending and contracting the passageway, as well as the function of swinging the passageway horizontally.

More specifically, the primary object of the present invention is to connect the mobile supporting structure mentioned to the outer, i.e., outermost, section of the telescoping passageway, and to make it steerable, so that it is capable of extending and contracting the passageway, in addition to swinging it horizontally.

Another object of the invention is to locate the mobile supporting structure between the ends of the outer section of the telescoping passageway so that there is some overhang between the supporting structure and the outer end of the passageway, such overhang counterbalancing at least part of the weight of that portion of the passageway which lies between the mobile supporting structure and an anchoring structure to which the inner end of the passageway is pivotally connected. This counterbalancing effect simplifies the structure of and tends to minimize binding of the telescoping connections between the various sections of the passageway, which is an important feature of the invention.

Another object of the invention is to provide a vehicle-engaging nose pivotally connected to the outer end of the outer section of the telescoping passageway for movement about a vertical axis and having a bumper engageable with the aircraft around the doorway therein. Since this nose is pivotally connected to the outer section of the telescoping passageway, it may readily accommodate itself to the side of the fuselage of the aircraft in the vicinity of the doorway, it being unnecessary that such portion of the fuselage be perpendicular to the passageway. This is an important feature since it means that accurate positioning of the aircraft relative to the terminal building is unnecessary.

Another object of the invention is to provide the pivoted nose at the outer end of the telescoping passageway with an inflatable bumper to minimize the possibility of damage to the aircraft on contact by the bumper.

The foregoing objects, advantages, features and results of the present invention, together with various other objects, advantages, features and results thereof which will be evident to those skilled in the art in the light of this disclosure, may be achieved with the exemplary embodiment of the invention described in detail hereinafter and illustrated in the accompanying drawings, in which:

FIG. 2 is a side elevation of a telescoping loading and unloading structure of the invention in its retracted condition;

FIG. 3 is a plan view of the telescoping structure in its retracted condition;

FIG. 4 is an enlarged, fragmentary view taken along either of the arrowed lines 4—4 of FIG. 1;

FIG. 5 is an enlarged, fragmentary sectional view taken along the arrowed line 5—5 of FIG. 4;

FIG. 6 is a fragmentary bottom plan view taken as indicated by the arrowed line 6—6 of FIG. 2;

FIG. 7 is an enlarged, fragmentary view taken along the arrowed line 7—7 of FIG. 3;

FIG. 8 is a sectional view taken along the arrowed line 8—8 of FIG. 7; and

FIG. 9 is an enlarged, fragmentary sectional view taken along the arrowed line 9—9 of FIG. 8 of the drawings.

Figure 1:
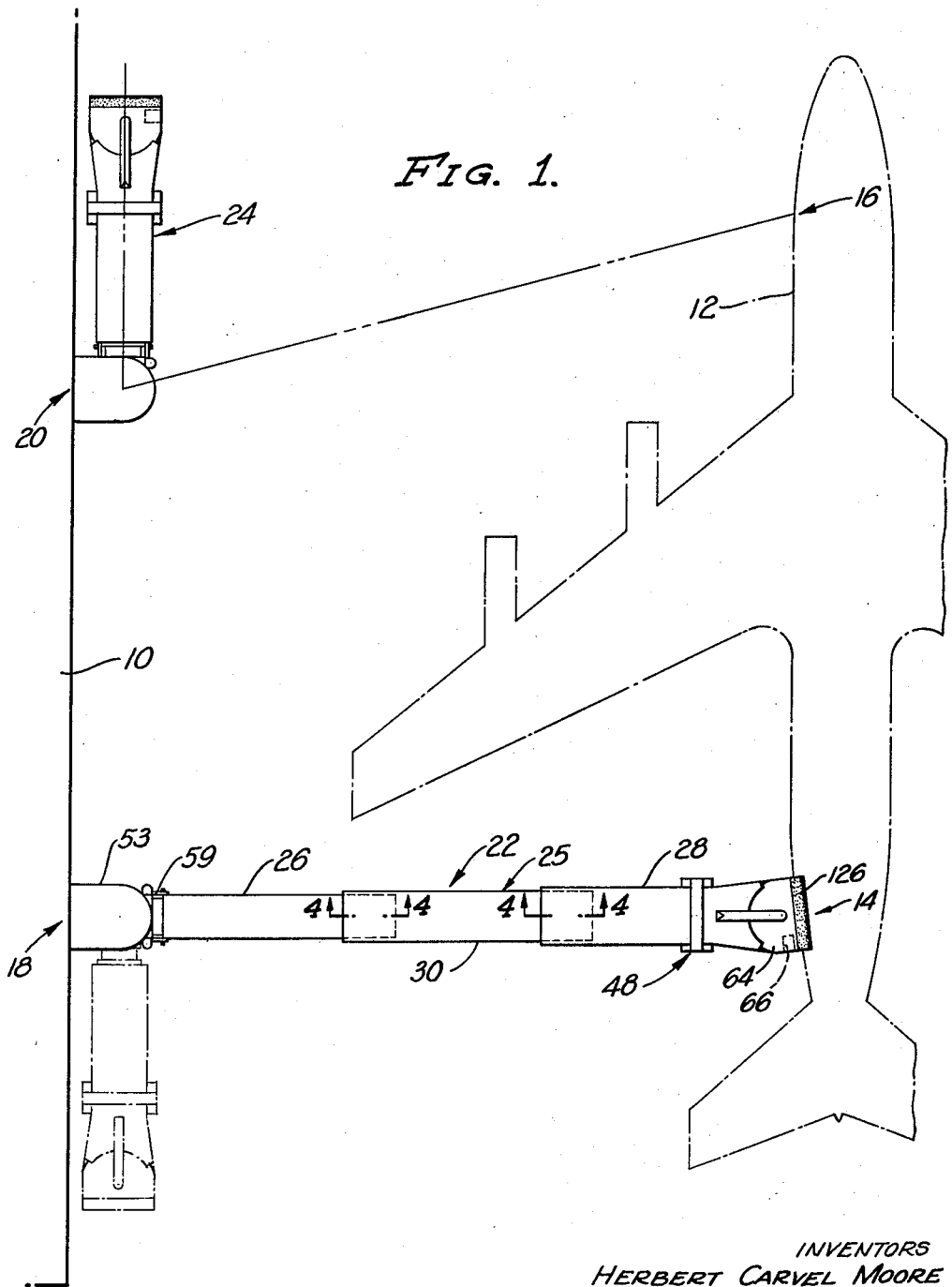
FIG. 1 is a semidiagrammatic plan view of an airport installation embodying the present invention.

Referring first to FIG. 1, the numeral 10 designates an airport terminal building adjacent which is parked an aircraft 12 to be loaded or unloaded. The aircraft 12 is provided with doorways, not shown, at the points 14 and 16 and the building 10 is provided with corresponding doorways, not shown, at points 18 and 20, the doorways in the building preferably being at the second floor level so that they are at more or less the same elevation as the doorways in the aircraft 12.

The space between the doorways at the points 14 and 18 is adapted to be bridged by a telescoping loading and unloading structure 22 of the invention and the space between the doorways at the point 16 and 20 is adapted to be spanned by an identical telescoping loading and unloading structure 24 of the invention. Each of the telescoping structures 22 and 24 is pivotally anchored relative to the building 10 at its inner end for movement about horizontal and vertical axes, and is extensible and contractable, so that its outer end may be brought into precise register with the corresponding doorway in the aircraft 12. The fact that the doorways in the building 10 are at the second floor level makes the telescoping structures 22 and 24 at least approximately horizontal since the doorways in the aircraft 12 are at about the same level, thereby facilitating movement of passengers to and from the aircraft and leaving the ground level clear for the handling of baggage, and the like. When not in use, the telescoping structures 22 and 24 may be contracted and swung into positions parallel to the building 10, as illustrated by the position shown for the telescoping structure 24 and as illustrated by the broken line position of the telescoping structure 22.

Since the two telescoping structures 22 and 24 are identical, the balance of this disclosure will be restricted to a consideration of the telescoping structure 22.

The loading and unloading structure 22 includes a telescoping passageway 25 having at least two telescopically connected sections to provide at least an inner section 26 and an outer section 28, the particular structure shown including a third, intermediate section 30 to provide a greater ratio of extended length to contracted length than is possible to obtain with two sections. As will be apparent, any number of sections greater than one may be utilized and the invention is not limited to any particular number.

Preferably, the telescoping passageway 25 is a completely enclosed passageway, which effect is achieved by making the sections 26, 28 and 30 thereof tubular. While other cross sections for the passageway 25 may be utilized, they are preferably rectangular, as shown in FIG. 8 of the drawings. This permits full utilization of the total width of the passageway 25, and also facilitates construction of the sections 26, 28 and 30 since each may be made with plane walls joined at the corners of such section. Also, no keying of the sections 26, 28 and 30 against rotation relative to each other is necessary with rectangular cross sections therefor.

The sections 26, 28 and 30 of the telescoping passageway 25 may be of any suitable construction. For example, referring to FIG. 5 of the drawings, each may comprise panels 32 having cellular or honeycomb cores 34 faced with sheets 36 of metal, or other suitable material, this construction serving to minimize transmission of noise into the passageway 25. At each corner of each section 26, 28 and 30, the panels 32 are suitably interconnected, as by connecting them to frame members 38 extending longitudinally of the passageway 25. The frame members 38 at each corner are shown as joined by an angle member 40 and by a member 42 having flanges 44 suitably connected to the respective frame members and interconnected by an inclined web 46 which performs a function to be described hereinafter. This construction for the sections 26, 28 and 30 provides an extremely lightweight telescoping passageway 25, which is an important feature.

The inner, intermediate and outer sections 26, 30 and 28 of the telescoping passageway 25 are progressively larger, the intermediate section 30 being telescoped over the inner section 26 and the outer section 28 being telescoped over the intermediate section 30. This arrangement facilitates connecting a mobile supporting structure 48 to the outer section 28, as will be described hereinafter, to achieve the results hereinbefore outlined.

As shown in FIGS. 4 and 5 of the drawings, the corners of the outer and intermediate sections 28 and 30 are provided internally thereof with longitudinally spaced, inclined rollers 50 which engage the corresponding inclined webs 46 on the intermediate and inner sections 30 and 26, respectively, the inclined webs 46 on the intermediate and inner sections thus acting as tracks for the rollers 50 on the outer and intermediate sections 28 and 30 so that friction between the various sections is minimized. The use of the inclined rollers 50 at each corner of the outer and intermediate sections 28 and 30 stabilizes these sections with respect to horizontal and vertical loads. The rollers 50 are mounted on the outer and intermediate sections 28 and 30 in any suitable manner, as by means of brackets 52.

Referring to FIGS. 2 and 3 of the drawings, the inner end of the inner section 26 of the telescoping passageway 25 is universally mounted relative to the building 10 so that the passageway may pivot relative to the building about horizontal and vertical axes. The inner end of the inner section 26 is universally supported relative to the building 10 on an anchoring means which comprises a pedestal 56 in the construction illustrated. The inner end of the inner section 26 is connected to a frame 59 by a horizontal pivot 60, which permits vertical swinging of the passageway 25 about a horizontal axis, and the frame 59 is journalled on a vertical shaft 58 on the pedestal 56, which permits horizontal swinging of the passageway about a vertical axis. This construction permits positioning the outer end of the passageway 25 in any desired location within the ranges of pivotal movement provided by the components of the universal connection of the inner end of the inner section 26 relative to the building 10. While the inner end of the inner section 26 is shown as universally connected to the pedestal 56 externally of the building 10, it will be understood that it may also be connected directly to the structure of the building if desired.

Considering further the connection between the interior of the building 10 and the passageway 25, it includes a foyer-like structure 53 supported by the pedestal 56 through the shaft 58, although the structure 53 may be supported directly by the building. Swingable horizontally with the passageway 25 relative to the structure 53, as by being mounted on the frame 59, is a connecting structure 54 relative to which the passageway 25 is vertically swingable and relative to which the inner end of the inner section 26 is vertically pivotable with a sliding, weatherproof fit. The connecting structure 54 carries two vertically oriented spring reels 55 on which are wound curtains 57 wrapped around the foyer-like structure 53 in circular arcs. As the passageway 25 is swung horizontally, one curtain 57 is wound on its reel 55 and the other is unwound from its reel, thereby maintaining a weatherproof interconnection between the structures 53 and 54.

Considering the mobile supporting structure 48 with particular reference to FIGS. 7 to 9, it is a self-propelled, steerable, wheeled structure which includes a frame 62 suitably connected to the outer section 28 of the passageway 25 in a manner not specifically shown. As will be apparent, since the mobile supporting structure 48 is connected to the outer section 28 of the passageway 25, the passageway may be extended and contracted merely by causing the mobile supporting structure to move toward and away from the building 10. Also, the passageway 25 may be swung horizontally merely by causing the mobile supporting structure 48 to move in a direction parallel to the building 10. Thus, connecting the mobile supporting structure 48 to the outer section 28, and making it steerable, permits it to perform the dual function of swinging the passageway 25 horizontally and extending and contracting it, this dual function being performed merely by appropriately maneuvering the mobile supporting structure, which is an important feature of the invention. In order to swing the passageway 25 vertically to raise and lower the outer end thereof, the mobile supporting structure 48 is provided with means for raising and lowering the passageway, as will be described hereinafter.

The passageway 25 is provided at its outer end with a nose 64 which is engageable with the fuselage of the aircraft 12 around the doorway at the point 14, as described in more detail hereinafter. Preferably, the mobile supporting structure 48 is controlled from an operating station in a cab 66 carried by the nose 64 so that the operator of the structure 22 may bring the nose 64 into position relative to the aircraft doorway at the point 14 carefully and accurately.

Considering the mobile supporting structure 48 in more detail, it includes two self-propelled wheels 68 mounted on the frame 62. The wheels 68 are independently driven in any suitable manner, as by electric or hydraulic motors 70 carried by housings 72 for the wheels and connected to the wheels by chains 74. The motors 70 are suitably controlled from the cab 66. As will be apparent, independently driving the wheels 68 in this manner eliminates any necessity for differential gearing therebetween.

The mobile supporting structure 48 is rendered steerable by making the housings 72 for the wheels 68 casters, the wheels being rotatably mounted on such housings. More particularly, the housings 72 carry vertical shafts 76 which are rotatably mounted on the frame 62. Steering of the wheels 68 is accomplished by gearing to the vertical shafts 76 horizontal steering shafts 78, the steering shafts being interconnected by a gear unit 80 which causes the two steering shafts to rotate in opposite directions so that the wheels 68 will be steered in the same direction with the connections shown between the steering shafts 78 and the vertical shafts 76. One of the steering shafts 78 is equipped with a pinion 82 which is meshed with a steering rack 84 connected to and adapted to be reciprocated by a piston 86 operating in a cylinder 88 on the frame 62. As will be apparent, if the piston 86 is moved in one direction by fluid pressure applied thereto, the wheels 68 will be steered in one direction, the wheels being steered in the opposite direction upon reverse movement of the piston.

Considering the manner in which fluid pressure is applied to the piston 86 to produce movement thereof in one direction or the other, the frame 62 carries an electric motor 90 which drives a hydraulic pump 92 the discharge from which is controlled by an electrically operated selector valve 94, this valve communicating with fluid lines 96 communicating with opposite ends of the cylinder 88. When the selector valve 84 is in one of its operating positions, fluid from the pump 92 is delivered to one end of the cylinder 88 to steer the supporting structure 48 in one direction, and vice versa. The selector valve 94 is preferably controlled from the cab 66 on the nose 64.

It will be apparent that, with the structure thus far described, the nose 64 of the telescoping passageway 25 may be positioned any desired distance from the building 10, within the limits of telescoping movement of the telescoping passageway 25, and may be located at any desired point parallel to the building 10, within the limits of the range of pivotal movement provided by the connection of the inner end of the inner section 26 to the pedestal 56. In order to swing the telescoping passageway 25 vertically to raise and lower the nose 64, the structure described in the following paragraphs is provided.

The frame 62 of the mobile supporting structure 48 includes upper and lower sections 98 and 100 which are relatively movable in the vertical direction, the upper section 98 being rigidly secured to the outer passageway section 28 and the lower section 100 having the wheels 68, and their driving and steering means, mounted thereon. The lower frame section 100 includes two posts 102 which embrace the outer section 28 of the passageway 25 and which are respectively engaged by opposed sets of vertically spaced rollers 104 on the upper frame section 98, the two sets of rollers 104 preventing relative movement of the frame sections 98 and 100 laterally of the passageway while permitting relative vertical movement thereof. Each post 102 is embraced and engaged by two sets of vertically spaced rollers 106 respectively located on opposite sides thereof in a direction longitudinally of the passageway 25. The paired sets of opposed rollers 106 in engagement with the posts 102 prevent relative movement of the upper frame sections 98 and 100 longitudinally of the passageway, while permitting relative vertical movement thereof.

Considering how the passageway 25 is swung in the vertical direction to raise and lower the nose 64 as required, the posts 102 carry racks 108 meshed with pinions 110 on a shaft 112 rotatably mounted on the upper frame section 98. The shaft 112 is driven by a motor 114 on the upper frame section 98 through a suitable driving connection indicated generally by the numeral 116. As will be apparent, by driving the motor 114, which is a reversible motor, in one direction or the other, the nose 64 may be raised or lowered, the motor 114 preferably being controlled from the cab 66 in the nose.

The nose 64 is pivotally connected to the outer end of the outer passageway section 28 for movement about a vertical axis by means of vertical pivots 118, FIGS. 2, 3 and 6. This permits positioning the outer end of the nose 64 in absolute parallelism with the surface of the fuselage in which the doorway at the point 14 is formed, which is an important feature. Preferably, the nose 64 merely pivots freely about its vertical pivot axis and is biased to a centered position by springs 119, FIG. 6, interconnecting it and the outer passageway section 28. However, the nose 64 may be pivoted under power by mounting thereon a gear sector 120 with which is meshed a pinion 122 driven by a reversible motor 124 mounted on the outer passageway section 28. As will be apparent, by driving the motor 124 in one direction or the other, the nose 64 may be pivoted correspondingly. Preferably, the motor 124 is controlled from the cab 66 in the nose 64.

The outer end of the nose 64 is provided with an inflatable bumper 126 to prevent damage to the aircraft 12 on contact therewith. While the bumper 126 may be a single inflatable bag or sac encircling the passageway through the nose 64, it is shown as including separate inflatable sections 128.

It is thought that the operation of the invention will be apparent from the foregoing so that only a brief summary thereof will be presented at this point. When it is desired to utilize the telescoping structure 22 to bridge the space between the doorway in the aircraft 12 at the point 14 and the doorway in the building 10 at the point 18, the operator in the cab 66 maneuvers the mobile supporting structure 48 to extend or contract the telescoping passageway 25 and to swing such passageway horizontally as required to move the nose 64 into the proper position, at the same time operating the motor 114 as required to raise or lower the nose 64 into the proper position. As the nose 64 approaches the proper position, the operator in the cab 66 also pivots the nose so that its outer end is parallel to the fuselage of the aircraft 12 at the doorway, on the nose assumes this position automatically when the free pivoting arrangement described previously is used. Since the operator is preferably located in the cab 66 on the nose 64, the various operations necessary to bring the nose into engagement with the fuselage around the doorway are readily performed.

Although an exemplary embodiment of the invention has been disclosed herein for purposes of illustration, it will be understood that various changes, modifications, and substitutions may be incorporated in such embodiment without departing from the spirit of the invention as defined by the claims which follow.

We claim:

1. In a loading and unloading structure for vehicles, the combination of:
   (a) an extensible and contractible passageway having inner and outer ends and comprising at least two telescopically connected sections progressively increasing in cross-sectional dimensions from said inner end of said passageway to said outer end thereof so that each section inwardly of the outermost is telescoped into the adjacent section outwardly thereof;
   (b) means supporting said inner end of said passageway for horizontal swinging movement of said passageway about an upright axis;

(c) a wheeled, steerable, ground-engaging supporting structure for said outer end of said passageway connected to said outermost of said telescopically connected sections of said passageway and adapted to extend or contract said telescopically connected sections of said passageway relative to each other;

(d) steering means connected to said supporting structure for steering same;

(e) propelling means connected to said supporting structure for propelling same; and (f) said supporting structure being connected to a portion of said outermost of said telescopically connected sections of said passageway which is spaced inwardly from the outer end of said outermost section and which is telescoped over the adjacent section inwardly thereof when said sections are completely contracted relative to each other.

2. In a loading and unloading structure for vehicles, the combination of:

(a) an extensible and contractible passageway having inner and outer ends and consisting of a series of telescopically connected sections of progressively increasing cross sectional dimensions from the innermost section to the outermost section;

(b) means supporting said inner end of said passageway for horizontal swinging movement of said passageway about an upright axis;

(c) steerable supporting means connected to said outermost section of said passageway for horizontally swinging said passageway about said upright axis and/or extending or contracting all of said telescopically connected sections of said passageway relative to each other; and (d) said outermost section being telescoped over the adjacent section inwardly thereof when said sections are contracted relative to each other.

3. A loading and unloading structure for vehicles as set forth in claim 2 wherein said outermost section includes as part thereof an aircraft-engaging nose constituting said outer end of said passageway and engageable with an aircraft around a doorway therein.

References Cited by the Examiner

UNITED STATES PATENTS

| | | | |
|---|---|---|---|
| 243,056 | 6/81 | Brown | 14—71 |
| 524,712 | 8/94 | Gandin | 160—120 |
| 2,311,457 | 2/43 | Muhr | 160—122 |
| 2,441,913 | 5/48 | Taylor | 193—41 |
| 2,601,361 | 6/52 | Blatz | 160—122 |
| 2,688,761 | 9/54 | Good | 14—71 |
| 2,700,169 | 1/55 | Henion | 14—72 |
| 2,749,137 | 6/56 | Thomson | 189—26 |
| 2,778,674 | 1/57 | Attendu | 14—71 X |
| 2,875,457 | 3/59 | Read | 14—71 |
| 2,894,572 | 7/59 | Nelson | 160—67 |
| 2,931,681 | 4/60 | Keller | 14—71 X |
| 3,034,162 | 5/62 | Smith | 14—72 |

FOREIGN PATENTS 776,317  10/34  France.

OTHER REFERENCES

Popular Science, page 103, July 1958.

JACOB L. NACKENOFF, *Primary Examiner.*
WILLIAM I. MUSHAKE, *Examiner.*